Sept. 8, 1959      H. K. GLEASMAN      2,903,107
HUB BRAKES FOR VELOCIPEDES AND THE LIKE
Filed Sept. 30, 1957
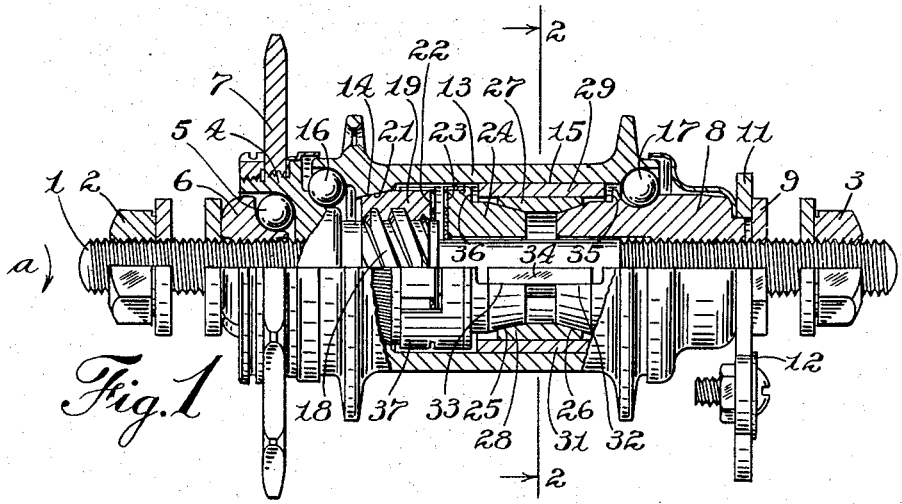
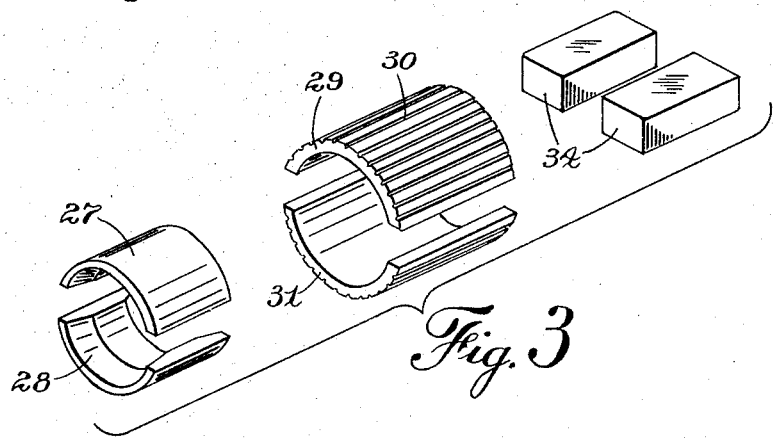
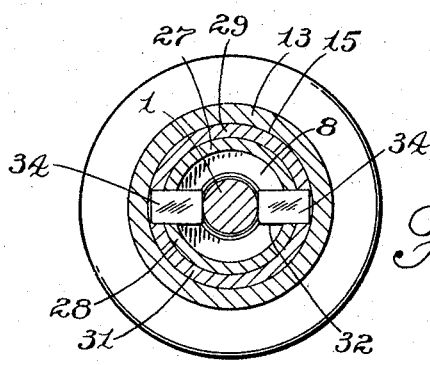
WITNESS:
INVENTOR.
Hollis K. Gleasman
BY
ATTORNEY United States Patent Office 2,903,107
Patented Sept. 8, 1959

2,903,107

HUB BRAKES FOR VELOCIPEDES AND THE LIKE

Hollis K. Gleasman, Elmira, N.Y., assignor to Bendix Aviation Corporation, Elmira Heights, N.Y., a corporation of Delaware Application September 30, 1957, Serial No. 687,264

3 Claims. (Cl. 192—6)

The present invention relates to hub brakes for velocipedes or the like and more particularly to improved means for actuating the braking elements.

The presently prevalent form of hub coaster brake illustrated in the patent to Hood 2,410,785 issued November 5, 1946, performs best when the braking area in the interior of the hub has a slightly roughened surface. To secure such optimum performance, it is necessary to exercise close control over the production of this finish, as well as discrimination in selection of the lubricant, and care in the adjustment of the expanding cones for the brake shoes; otherwise, if the brake is applied vigorously and continuously until the hub stops rotating, the brake may stick and fail to release.

When the brake is applied, the movable expander cone forces the brake shoes against the stationary anchor cone thus pressing the shoes out against the interior of the hub and wedging them between the cones and hub. If this pressure is continued until the hub comes to rest, most of the lubricant will be wiped off and pressed out from between the brake shoes and hub, and their surfaces will be held together under static friction. When the operator relaxes his pedal pressure on the brake, the brake shoes, in order to release, must slide axially on the dry roughened interior surface of the hub away from the anchor cone member. Failure to do so produces a sticky brake.

It is an object of the present invention to provide a hub coaster brake of the cone and shoe type incorporating novel expanding means for the brake shoes which operate smoothly and easily, and release promptly and freely irrespective of the character of the braking surfaces.

It is another object to provide such a device in which release of the brake can take place without requiring the brake shoes to move axially with respect to the hub.

Further objects and advantages will be apparent from the following description taken in connection with the accompanying drawing in which:

Fig. 1 is a side elevation, partly broken away and in section of a preferred embodiment of the invention;

Fig. 2 is a section taken substantially on line 2—2 of Fig. 1; and

Fig. 3 is a detail in perspective of the brake shoes and expander shoes with the keys for preventing rotation thereof shown in disassembled relation.

In Fig. 1 of the drawing there is illustrated an axle 1 which is arranged to be rigidly mounted in the rear fork of the frame of a bicycle or the like, not illustrated, by means of clamping nuts 2 and 3. A driving member indicated generally by the numeral 4 is rotatably mounted on the axle 1 by means of bearings 5 rotating on a cone 6, and is adapted to be rotated by a sprocket 7 fixedly mounted thereon and actuated by the rider of the vehicle in the usual manner.

A brake anchor member 8 is fixedly mounted on the axle 1 by means of a clamp nut 9, rotation of the anchor member being prevented by a brake arm 11 connected to the vehicle frame by a clip 12. A wheel hub 13 having a frictional clutch surface 14 and a cylindrical braking surface 15 is rotatably mounted on the driving member 4 and anchor member 8 by means of bearings 16 and 17 respectively.

The driving member 4 comprises a screw shaft 18, and a clutch nut 19 threaded thereon is provided with a conical surface 21 for clutching engagement with the surface 14 of the hub. The clutch nut 19 is provided with dentals 22 adapted to engage similar dentals 23 on a brake actuating member 24 which is slidably mounted on the axle 1.

The actuating member 24 and the anchor member 8 are formed with converging frusto-conical surfaces 25 and 26, and a plurality of arcuate expander shoes 27, 28 formed at their ends with conforming frusto-conical surfaces are mounted thereon. The expander shoes 27, 28 are formed with smooth cylindrical exterior surfaces on which a plurality of brake shoes 29, 31 are slidably mounted. The brake shoes 29, 31 are cylindrical in form, and the interior surfaces are smooth and have a free sliding bearing on the expander shoes. The exterior surfaces of the brake shoes are preferably grooved as indicated at 30 (Fig. 3) in order to improve the effectiveness of their frictional engagement with the interior surface 15 of the hub 13.

The anchor member 8 and brake actuating member 24 are provided with axially extending recesses 32 and 33 respectively which are rectangular in cross section, and a plurality of rectangular keys 34 are seated at their ends in said recesses and are interposed between the expander shoes 27, 28 and between the brake shoes 29, 31, whereby rotation of the expander shoes and brake shoes is prevented, without interfering with relative axial movement thereof. The axial movement of the brake shoes 29, 31 is limited by shoulders 35, 36 on the anchor member 8 and brake actuating member 24 respectively.

In operation, forward rotation of the driving member 4, in the direction of the arrow a, causes the clutch nut 19 to be traversed to the left in Fig. 1 in order to clutch and transmit rotation to the hub 13. When the operator wishes to apply the brake, backward rotation of the driving member 4 and screw shaft 18 traverses the clutch nut 19 into dental engagement with the brake actuating member 24. Traversal of the clutch nut 19 is insured by a frictional drag member 37 mounted on the brake actuating member 24 and bearing frictionally on the clutch nut. After engagement of the dentals 22, 23, rotation of the clutch nut 19 is positively prevented since rotation of the expander member 24 is prevented by the keys 34. Further backward rotation of the driving member and screw shaft thus forces the expander member 24 toward the anchor member 8, thus moving the expander shoes 27, 28 radially outward and causing frictional engagement of the brake shoes 29, 31 with the hub.

When the operator releases the backward pressure on the driving member 4, the brake actuating member 24 is free to back away from the expander shoes 27, 28, and since both the interior and exterior surfaces of the expander shoes and the interior surfaces of the brake shoes are smooth and well lubricated, the expander shoes move freely away from the anchor member 8, thus relieving the radial pressure on the brake shoes 29, 31 and releasing the brake.

Although but one form of the invention has been shown and described in detail it will be understood that changes may be made in the form and arrangement of the parts without departing from the spirit of the invention.

I claim:

1. In a hub coaster brake for velocipedes and the like, an axle, means for rigidly mounting the axle in the frame of the vehicle, an anchor-expander member fixedly mounted on the axle, a driving member rotatably mounted on the axle, a clutch nut threaded on the driving member, a hub rotatably mounted on the driving member and the anchor member having an interior cylindrical braking surface, a brake actuating member slidably mounted on the axle in the path of movement of the clutch nut and in juxtaposition to the anchor member, said brake actuating member and anchor member having opposed frusto-conical surfaces, a plurality of arcuate expander shoes having interior frusto-conical surfaces resting on the corresponding surfaces of the brake actuating member and anchor member, and exterior smooth cylindrical surfaces, a plurality of arcuate brake shoes having interior smooth cylindrical surfaces bearing on the expander shoes with freedom for relative longitudinal movement, and exterior cylindrical surfaces for frictional engagement with the braking surface of the hub; and means for preventing rotation of the brake actuating member, the brake shoes and expander shoes while permitting relative axial movement thereof.

2. A hub coaster brake as set forth in claim 1 in which the brake expander member and the anchor member are provided with opposed axially extending recesses, and the means for preventing rotation of the brake shoes comprises a rectangular key interposed between said shoes and slidably seated at its ends in said recesses; in which said key member is also interposed between the expander shoes and prevents their rotation while allowing axial shifting movement thereof.

3. A hub coaster brake as set forth in claim 2 in which the anchor member and the brake expander member are provided with means for limiting the axial movement of the brake shoes.

References Cited in the file of this patent

UNITED STATES PATENTS

| | | |
|---|---|---|
| 882,159 | Morrow | Mar. 17, 1908 |
| 960,736 | Toohey | June 7, 1910 |
| 1,017,472 | Sachs | Feb. 13, 1912 |
| 2,410,785 | Hood | Nov. 5, 1946 |
| 2,552,484 | Hood | May 8, 1951 |

FOREIGN PATENTS

| | | |
|---|---|---|
| 216,965 | Germany | Dec. 13, 1910 |
| 230,756 | Germany | Feb. 4, 1909 |
| 430,406 | Great Britain | June 18, 1935 |